GROUPING AND SHINGLING DEVICE FOR ROTARY DISK SLICING MACHINES

Original Filed April 11, 1950 4 Sheets-Sheet 1

INVENTOR.
Paul H. Meyer,
BY
Spencer, Johnston, Cook & Root
Attys.

GROUPING AND SHINGLING DEVICE FOR ROTARY DISK SLICING MACHINES

Original Filed April 11, 1950 4 Sheets-Sheet 2

INVENTOR.
Paul H. Meyer,
BY
Spencer, Johnston, Cook & Root
Attys

GROUPING AND SHINGLING DEVICE FOR ROTARY DISK SLICING MACHINES

Original Filed April 11, 1950 4 Sheets-Sheet 3

INVENTOR.
Paul H. Meyer,
BY
Spencer, Johnston, Cook & Root
Attys.

GROUPING AND SHINGLING DEVICE FOR ROTARY DISK SLICING MACHINES
Original Filed April 11, 1950 4 Sheets-Sheet 4
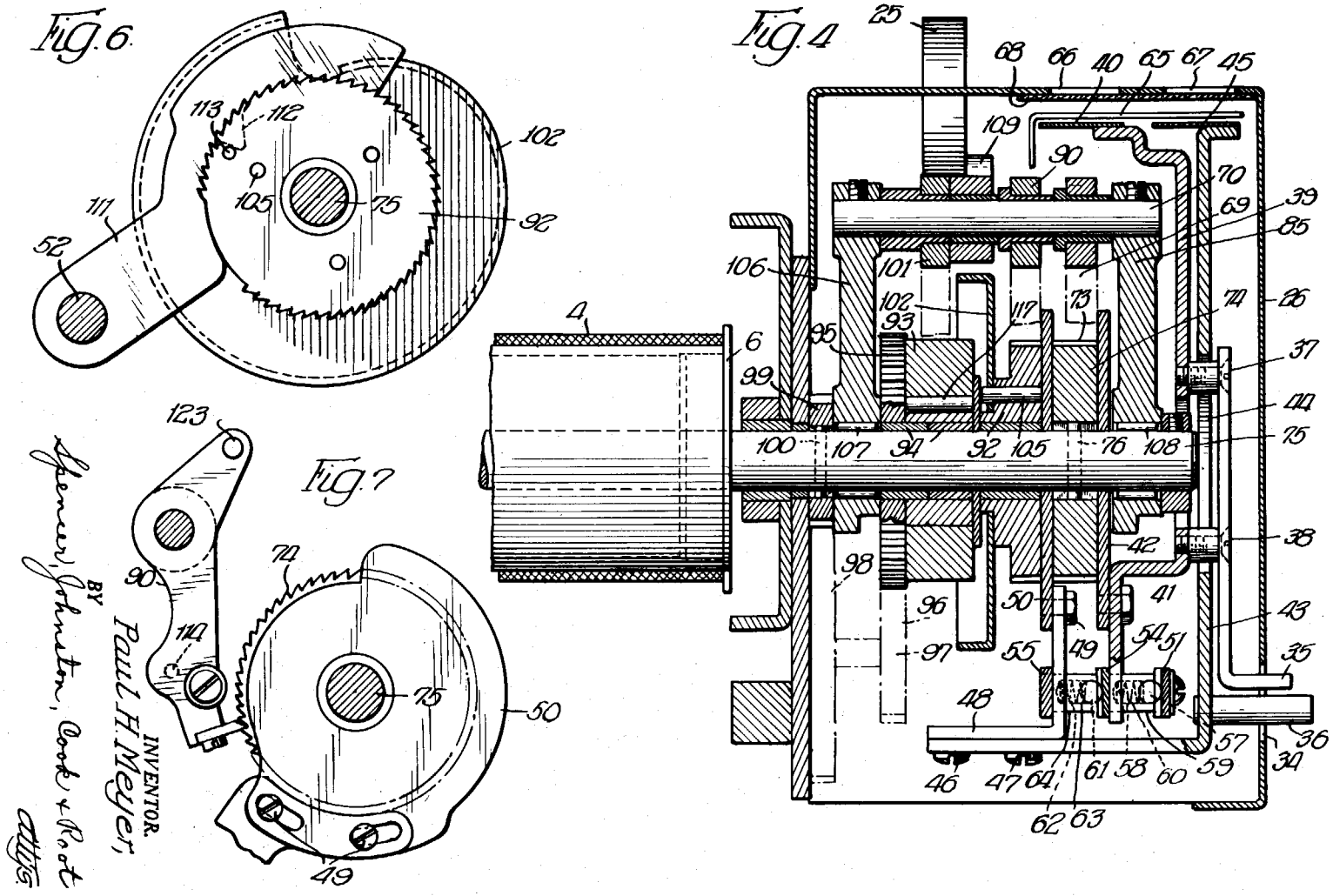
INVENTOR.
Paul H. Meyer,
BY
Spencer, Johnston, Cook & Root
Attys.

United States Patent Office

Re. 24,103
Reissued Dec. 20, 1955

24,103

GROUPING AND SHINGLING DEVICE FOR ROTARY DISK SLICING MACHINES

Paul H. Meyer, La Porte, Ind., assignor to U. S. Slicing Machine Company, Inc., La Porte, Ind., a corporation of Indiana

Original No. 2,687,207, dated August 24, 1954, Serial No. 155,284, April 11, 1950. Application for reissue January 20, 1955, Serial No. 483,187

7 Claims. (Cl. 198—34)

Matter enclosed in heavy brackets [ ] appears in the original patent but forms no part of this reissue specification; matter printed in italics indicates the additions made by reissue.

This invention relates to a grouping device operative in connection with a slicing machine, as, for example, a meat slicer in which slices are cut from a body or block of meat and transferred to a conveyor.

One of the objects of the invention is to provide a device for grouping slices as they are cut into stacks on a conveyor and moving such stacks on the conveyor in order to produce spaced stacks or groups of such slices which can be readily handled and packaged.

A further object of the invention is to provide a device for grouping and shingling slices and moving them on a conveyor at spaced intervals.

An additional object of the invention is to provide a device of the class described which operates in response to the movement of the fly of a meat slicer.

Other objects and advantages of the invention will be apparent by reference to the following description in conjunction with the accompanying drawings in which:

Figure 4 is a section taken along the line 4—4 of Figure 2;

Figure 6 is a partial sectional view taken along the line 6—6 of Figure 3; and

Figure 7 is a partial sectional view taken along the line 7—7 of Figure 3.

The type of slicing machine to which this invention is particularly adapted is illustrated in Stiles, U. S. Patent 1,231,959, and comprises an endless pronged receiver adapted to receive each slice as it is severed and to convey it past a fly having spaced fingers adapted to move between the prongs of the receiver and forcibly eject the slice from such prongs by movement back and forth and thereby to discharge the slices successively on a receiving platform or conveyor.

The grouping device of the present invention is adapted to move the conveyor in response to the movement of the fly and is adjustable to stack the slices on the conveyor with a predetermined number, say four to sixteen slices per group.

The device of the present invention is also adapted to shingle the slices by moving the conveyor a predetermined distance after each slice is deposited thereon and is adjustable so that the number of shingled slices can be varied.

Figures 1, 5:
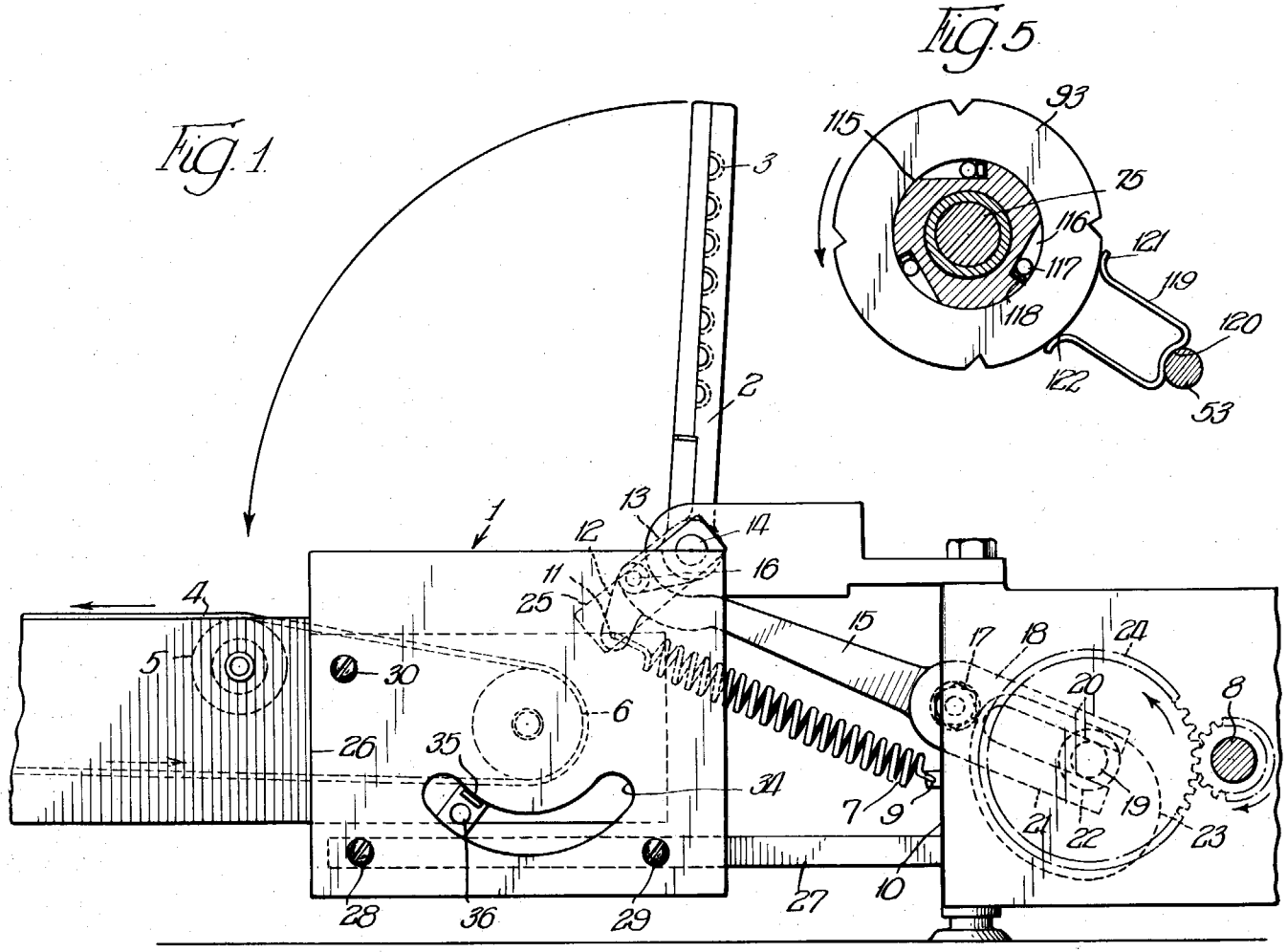
Figure 1 is a side elevational view of a machine constructed in accordance with the principles of this invention showing generally the driving relationship of certain elements of the machine.
Figure 5 is a partial sectional view taken along the line 5—5 of Figure 3.

In Figure 1 the grouping and shingling mechanism is generally shown at 1. The fly 2 which is provided with fingers 3 to remove the slices from the prongs of a conventional slicing machine illustrated in U. S. Patent 1,231,959, is reciprocated from a substantially upward or vertical position as shown in the drawing to a substantially horizontal position and on each downward movement deposits a slice on the belt conveyor 4 which is made of rubber or other suitable material and is shown with parts broken away. It will be understood that the conveyor 4 is a conventional type of conveyor and is mounted in a conventional manner, for example, on a series of rollers such as the idler roller 5 and the drive roller 6.

The movement of the fly 2 is controlled in a conventional manner by the spring 7 shown with parts broken away and by a driving mechanism driven from the fly wheel shaft 8.

The downward movement of the fly 2 to deposit a slice on the conveyor 4 is effected by the pull of the spring 7 which is connected at one end 9 to the frame 10 and at the other end 11 to an arm 12. The arm 12 is rigidly connected to an arm 13, being fastened to the flyshaft 14 on which the fly 2 is fixedly mounted. The lever 15 is pivotally connected to the arms 12 and 13 substantially at the junction thereof by means of a pin 16 or other suitable means.

The lever 15 is fastened by a bolt and cam roller member 17 or other suitable means to a yoke member 18 mounted on a shaft 19 so that the arms 20 and 21 act as a guide for the reciprocating movement of the lever 15.

In the position shown in Figure 1 the fly 2 is about to be urged downwardly by the spring 7 which will cause the yoke member 18 and the lever 15 to slide to the right over the shaft 19. The cam roller member 17 is actuated by a cam track 23 mounted on the gear 24 driven by the flywheel shaft 8. A collar 22 is provided to position the arms 20 and 21 on the shaft 19. As the flywheel shaft 8 rotates the gear 24 will be rotated in the direction of the arrows thereby causing the gear cam track 23 and its associated cam roller 17 to move the arm 15 and cause the fly 2 to be returned from a horizontal to a substantially vertical position shown in Figure 1.

The grouping device 1 is operated in response to the movement of the flyshaft 14 by being fixedly connected by means of an arm 25 with the flyshaft 14.

Figure 2:
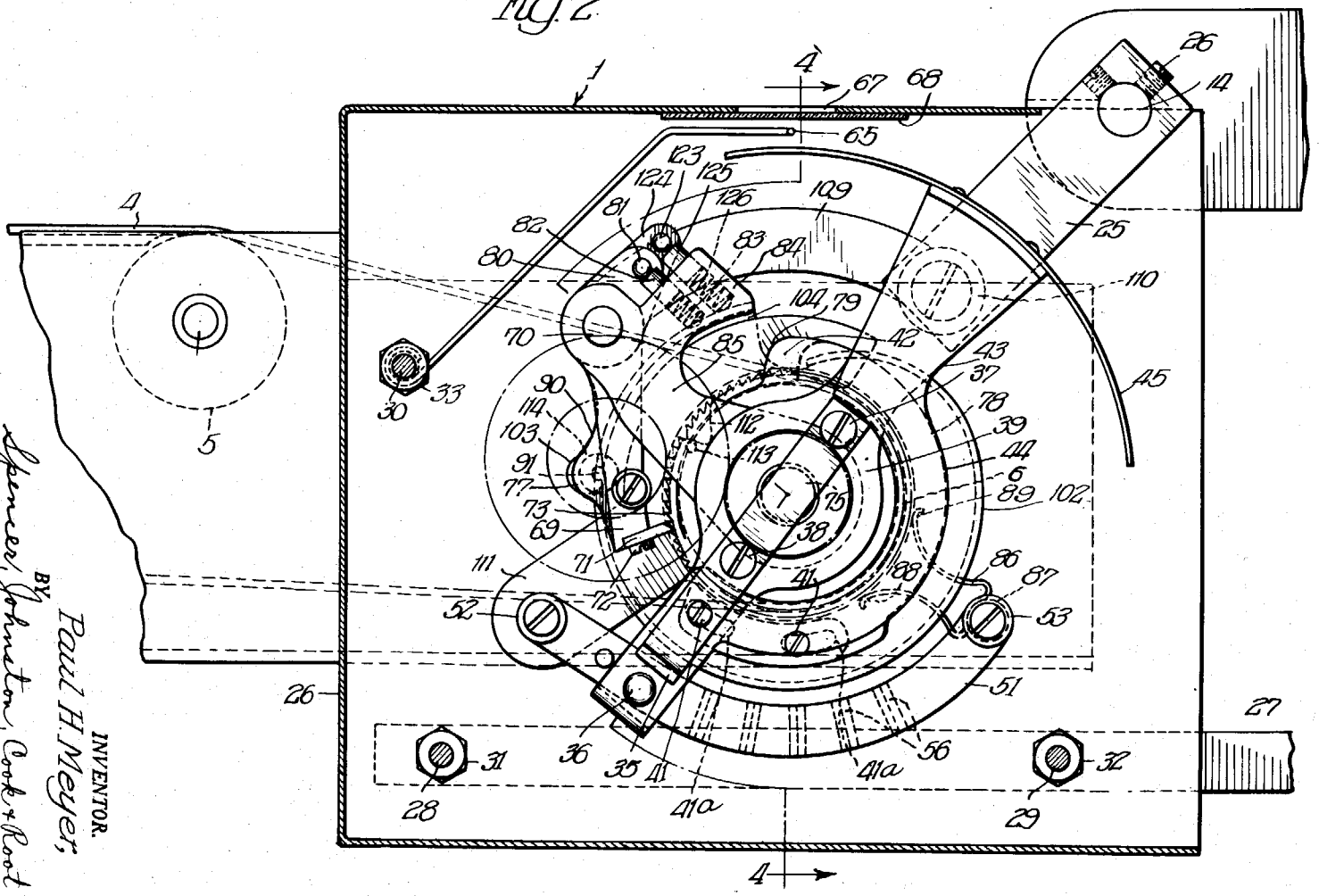
Figure 2 is an enlarged side elevational view of the grouping device provided in accordance with this invention.

As illustrated in Figure 2 the grouping device 1 comprises a housing 26 shown in section which is fastened to a frame member 27 and to other portions of the frame in any suitable manner, for example, by means of bolts 28, 29 and 30 extending through spacer elements 31, 32 and 33, respectively. The outside of the housing 26 shown in Figure 1 is provided with an opening 34 through which projects a shingling handle 35 and a grouper handle 36 each of which is movable back and forth in the opening 34 to adjust the spacing of the shingled slices, or the number of slices per group, or both.

The handle 35 is connected by means of bolts 37 and 38 to an arm 39 which is fastened at one end to a shingling indicating plate 40 and adjacent the other end by means of screws 41, 41 to a shingling adjusting cam 42. The screws 41, 41 pass through curved slots 41a, 41a (Figure 2). The slots permit the adjustment of the cam 42 with respect to the arm 39.

The grouper adjusting handle 36 is affixed to an arm 43 which has a curved portion 44 to permit it to pass around the bolts 37 and 38. The upper end of the grouper adjusting arm 43 is affixed to a curved grouping indicating plate 45. The lower end of the adjusting arm 43 is affixed by means of screws 46 and 47 or other suitable means to an L-shaped connecting arm 48. The L-shaped connecting arm 48 in turn is fastened by means of screws 49, 49 to the grouping adjusting cam 50. The screws 49, 49 correspond to the screws 41, 41 in cam 42 and are connected to the cam 50 through slotted openings similar to the openings 41a, 41a thereby permitting the adjustment of cam 50 with respect to arm 48. Thus it will be apparent that the shingling adjusting cam 42 can be moved by moving the handle 35 and the grouping adjusting cam 50 can be moved by moving the handle 36. The retention of these cams in a particular predetermined position in order to shingle or group, as the case may be, a given number of slices is effected by means of indexing plates.

The shingling indexing plate 51 is a curved member supported at its opposite ends by supporting shafts 52 and 53. The grouping indexing plate 54 is similar in shape to the shingling indexing plate and likewise is supported by the shafts 52 and 53. The guide plate 55 which is curved similarly to plates 51 and 54 is also supported by the shafts 52 and 53.

The inner side of the indexing plate 51 contains a series of notches 56 shown in dotted lines in Figure 2. Similarly the inner side of the grouping indexing plate 54 contains a series of notches. It will be understood that the number of notches will be varied depending on the desired shingling spacing and the desired number of slices per group, as the case may be. As an example, the grouping indexing plate 54 may contain eleven notches to correspond to from four to sixteen slices per group. The shingling indexing plate 51 may contain say ten notches which would give ten variations of slice spacing from the minimum to the maximum setting.

When the handle 35 is moved in order to adjust the cam 42 the retention of a particular position is accomplished by the ball 57 which is urged by means of a spring 58 into any one of the notches 56 on the inner side of the indexing plate 51. The ball and spring arrangement is carried as shown in Figure 4 by a collar 59 fastened to one end of the arm 39 and provided with a recess 60. As illustrated, the spring 58 is positioned against one end of the recess and presses the ball 57 outwardly in the direction of the indexing plate 51. The inner side of the lower end of the arm 39 contacts the outer smooth side of the grouping indexing plate 54 which thereby serves as a guide.

In a similar manner the ball 61 and the spring 62 are carried in a recess 63 in the collar 64 which is fastened to the arm 48 as shown in Figure 4. The spring 62 urges the ball 61 toward the notched inner side of the grouping indexing plate 54. Each time the ball enters a notch it serves to stop the handle 36 in a given position. However, the pressure of the spring 62 is sufficiently light so that the handle can readily be moved again to another position.

The device is calibrated so that the number of slices per shingle or group is shown on the indicating plates 40 and 45. An indicating wire 65 is provided so that the operator of the machine may view the indicating plates 40 and 45 through the windows 66 and 67, respectively, and align the indicating wire 65 with a predetermined number on the indicating plates 40 and 45. A glass or other transparent covering 68 is provided over the openings 66 and 67 to protect the device and prevent the entry of dust and dirt.

The indicator wire 65 is fastened around the shaft 30 as shown in Figure 2 but it will be understood that any other type of aligning means may be provided.

The shingling cam 42 is operatively associated with the shingling pawl 69 which is freely mounted on the supporting shaft 70. The pawl driving blade 71 which is affixed to the end of the pawl by means of a screw 72 (Figure 2) is adapted to engage the teeth 73 of shingling pawl wheel 74. The shingling pawl wheel 74 is fixed to conveyor drive shaft 75 by means of a drive pin 76.

The outer side of pawl 69 is provided with a cam roller 77 which rides on the upper surface 78 of the cam 42. When the cam roller 77 rides over the portion 79 it permits the blade 71 of the pawl 69 to engage the teeth 73 of the pawl wheel 74. Each time this occurs the conveyor 4 is moved. It will be apparent that the spacing of the shingled slices can be varied by rotating the cam 42 by means of the handle 35 in order to change the length of the engagement of the pawl 69 with its associated ratchet wheel 74. In the setting illustrated in Figure 2 the length of engagement is at a maximum. In other words, the spacing of the shingled slices represents a maximum for this particular device. As an example, if the device is constructed to shingle with number "1" on the indicator plate 40 as the minimum spacing of slices, and number "10" as the maximum, the shingling setting in this instance would be such that the numeral "10" would be opposite the indicator wire 65.

The spacing of the shingled slices is decreased by moving the handle 35 in a counterclockwise direction.

The projecting end 80 of the pawl 69 carries a fixed pin 81 which is urged outwardly by a pin 82 under the pressure of spring 83. The spring 83 and pin 82 are carried in an opening in the top of arm 84 which projects from the outer or front pawl lever 85. In this way the pawl 69 is always resiliently urged toward the ratchet wheel 74.

The grouping adjusting cam 50 is generally similar to the shingling adjusting cam 42. A timing pawl 90 is mounted on the shaft 70 in a manner similar to the shingling pawl 69. The timing pawl 90 is provided with a laterally extending cam roller 91 which cooperates with the upper surface of cam 50, and is directly behind cam roller 73 in Figure 2. The timing pawl 90 is generally similar in structure to the pawl 69 and drives ratchet wheel 92 in a manner generally similar to the manner in which the pawl 69 drives the ratchet wheel 74. However, the ratchet wheel 92 is freely mounted on the shaft 75 so that each stroke of the pawl 90 against the ratchet wheel 92 does not move the shaft 75. The friction pressure of the bent flat spring 86 made of spring metal or other suitable material prevents the ratchet wheel 92 from overrunning after each stroke of the pawl. It will be noted from Figure 2 that spring 86 is bent so that a curved portion 87 is supported by the shaft 53 and the portions adjacent the ends 88 and 89 impinge against the ratchet wheel 92. Each stroke of the pawl against the ratchet wheel 92 corresponds to the deposit of one slice on the conveyor 4 and the setting of the grouping indicator will determine the number of slices deposited on the conveyor 4 in a vertical stack before the grouping device moves the conveyor to make room for another stack.

The driving pawl wheel 93 and its clutch 115 are freely mounted by means of needle bearings 94 on the shaft 75. Driving clutch 115 is keyed to driving gear 95. Driving gear 95 engages gear 96 mounted on countershaft 97 thereby driving the gear 98 on said shaft which in turn drives the gear 99 fixed to the conveyor drive shaft 75 by means of drive pin 100. Thus the rotation of ratchet wheel 93 will cause the rotation of the drive roller 6 on which conveyor belt 4 is mounted.

A driving pawl 101 is mounted on shaft 70 in a manner similar to the shingling pawl 69 and the timing pawl 90. A driving pawl cam 102 is mounted around the shaft 75. A cam roller 103 extends outwardly from driving pawl 101 and cooperates with the upper surface of driving cam 102. When the cam roller 103 drops off of the cam 102 at the point 104 it permits the driving pawl 101 to engage the driving pawl or ratchet wheel 93. In the device illustrated in the drawings the driving pawl wheel or the ratchet wheel 93 contains four teeth spaced apart 90°. The driving pawl or ratchet wheels 74 and 92 each contain 96 teeth. It will be understood that the number of teeth in the various ratchet wheels may be varied depending upon the desired functioning of the device.

The driving cam 102 is keyed by means of a pin 105 to timing ratchet wheel 92. Each time the timing pawl 90 moves the ratchet wheel 92 it also moves cam 102. Eventually, therefore, cam 102 arrives at a point where the depression 104 is opposite the cam roller 103 of driving pawl 101. As driving pawl 101 drops into the depression 104 it engages the driving ratchet wheel 93 and thereby rotates the shaft 75 and the driving roller 6 and moves the conveyor in the manner previously described.

As previously pointed out the shingling pawl 69, the timing pawl 90 and the driving pawl 101 are all rotatably mounted on shaft 70. Shaft 70 is supported on the front side by the lever 85 and on the rear side by a lever 106. The levers 85 and 106 are mounted on needle bearings 107 and 108 for rotation on shaft 75. An arm 109 is freely mounted at one end on shaft 70 and is connected pivotally at 110 to the arm 25 which in turn is connected to flyshaft 14 in the manner previously described. As the flyshaft 14 rotates counterclockwise the connecting arms 25 and 109 cause the shaft 70 and its associated pawls to be retracted in a clockwise direction. When the flyshaft 14 rotates in a clockwise direction (i. e., as the fly is moving from a horizontal to an upright position) the shaft 70 and its associated pawls are moved in a counterclockwise direction. During this latter movement the pawls actuate their associated driving pawl wheels or ratchet wheels unless held out of engagement therewith by their associated cams. It will be clear therefore that if the conveyor 4 is moved the movement is effected on the up-stroke of the fly 2.

The machine may be operated in such a way that the fly 2 does not go through a complete cycle. This may be caused, for example, when the operator stops the operation in the middle of a cycle. As a result the timing pawl 90 may be thrown out of proper timing. To readjust the timing of the timing pawl 90 a timing pawl release cam 111 is provided. The release cam 111 is mounted for rotation on shaft 52. As shown in Figures 2 and 6 the underside of the timing pawl release cam 111 has a projecting portion 112. The innerside of the timing pawl ratchet wheel 92 has an inwardly projecting pin 113 in contact with the underside of the timing pawl release cam 111. When the device is out of proper timing the pin 113 will rotate against the projection 112 on the release cam 111 and cause the latter to be raised. When this occurs, the upperside of the release cam 111 will strike against the pin 114 on the innerside of the timing pawl 90 and cause the latter to be raised so that it cannot engage the teeth of the timing pawl ratchet wheel 92. In this manner the timing is corrected after one full stroke of the fly 2 and the device operates in proper timing thereafter.

The driving ratchet wheel 93 is provided with an internal clutch arrangement as illustrated in Figure 5 which consists of a notch wheel 115 mounted on the shaft 75 and having notches or recesses 116 in the periphery thereof. Each of the notches or recesses 116 contains a clutch roller 117 which is normally pressed outwardly by a flat clutch spring 118. This is a conventional one-way clutch arrangement permitting the ratchet wheel to rotate in one direction but not in the other. A spring 119 generally similar to spring 86 but of a slightly different shape is provided to prevent overrunning of the ratchet wheel 93. As shown in Figure 5 the curved portion 120 of the spring 119 is seated on the shaft 53 and the portions 121 and 122 adjacent the ends press against the surface of the ratchet wheel 93.

The pawl 90 is normally urged toward its associated ratchet wheel 92 by means of a pin 123 extending outwardly from the arm 124 which projects rearwardly from the pawl 90. As shown in Figure 2, the pin 123 engages a pin 125 which is spring pressed upwardly by a spring 126 seated in an opening of the arm 84 of the pawl lever 85.

Figure 3:
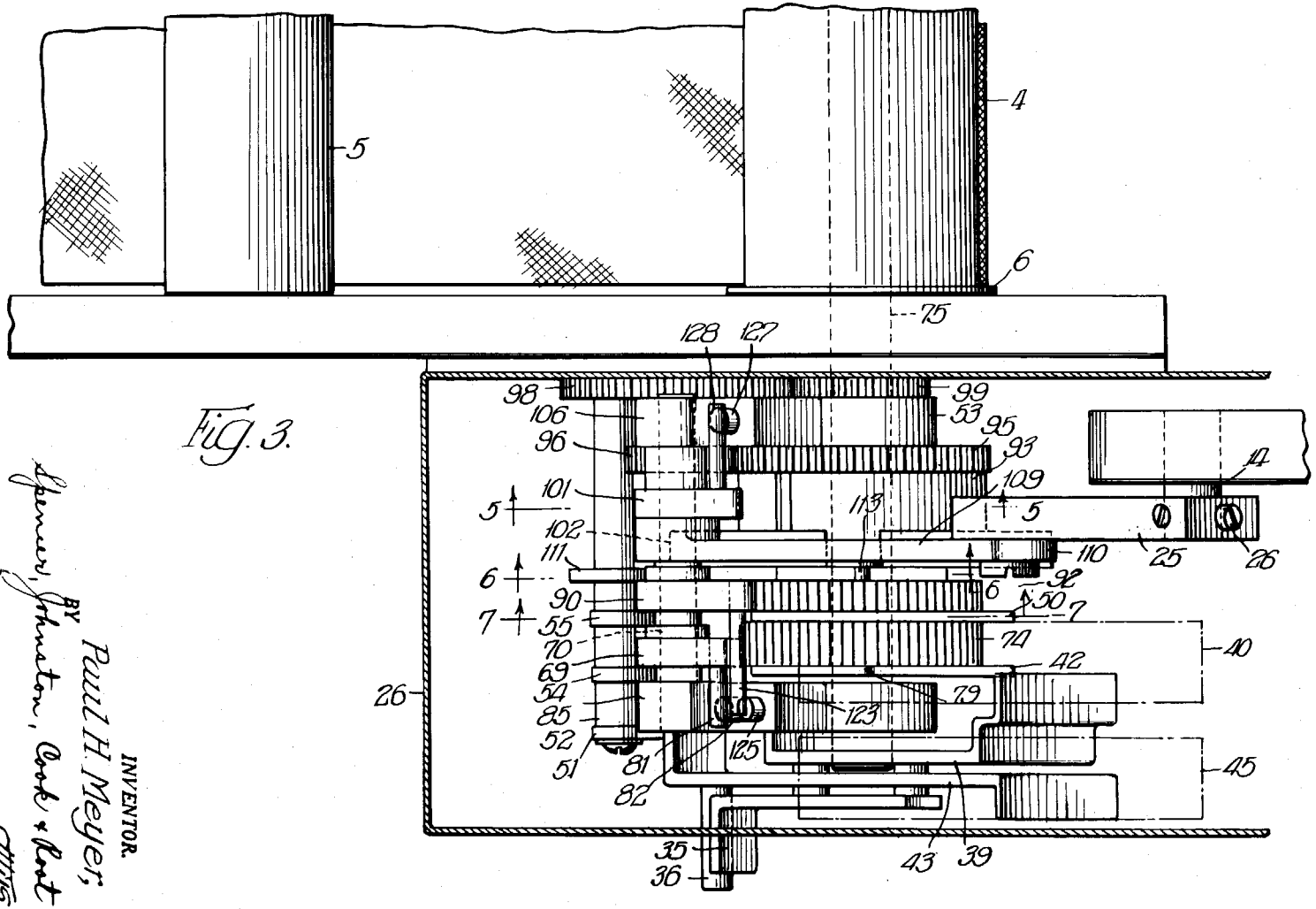
Figure 3 is a plan view of the gripping device shown in Figure 2.

The drive pawl 101 is normally urged toward the drive ratchet wheel 93 by the pressure of a spring pressed pin 127 (Figure 3) which engages the inwardly extending pin 128 fastened to a rearwardly extending arm of the drive pawl 101. The drive pawl 101 is identical in structure with pawl 69. The spring pressed pin 127 is mounted in a rearwardly extending arm on the upper end of the pawl supporting lever 106, which arm is generally similar to the arm 84 of the pawl supporting lever 85 except that it contains only one opening for a spring pressed pin instead of two.

The operation of the grouping and shingling device may be described as follows:

When the operator desires merely to group slices in a vertical stack he sets the operating lever 35 as far as it will go in a counterclockwise direction. This causes the outer circular portion of the cam 42 to engage the cam roller 77 of the shingling cam 42 continuously during the back and forth movement of the pawl 69. Thus, when the lever arm 25 is reciprocated by the fly shaft 14 causing the arm 109 to reciprocate the pawl shaft 70 the shingling pawl 69 is always held out of engagement with the teeth 73 of its associated ratchet wheel 74. Since the shingling mechanism cannot operate, each back and forth movement of the pawl shaft 70 will merely move the timing pawl 90. The conveyor drive shaft 75 will remain stationary. As the timing pawl 90 moves it will engage the teeth of the timing ratchet wheel 92 and cause the ratchet wheel 92 to move a predetermined distance depending upon the manual setting of the grouping handle 36. Each time the ratchet wheel 92 moves it will move the driving cam 102 a corresponding distance. During the movement of the driving cam 102 the cam roller 103 will ride on top of the cam 102 and keep the driving pawl 101 from engaging the driving ratchet wheel 93. After a predetermined number of strokes, depending upon the number of slices in each stack in accordance with the setting of the handle 36, the cam roller 103 will be opposite the depression 104 in the driving cam 102 and will drop down permitting the driving pawl 101 to engage the ratchet wheel 93. When the pawl shaft 70 moves in a forward direction with the driving pawl 101 in engagement with the ratchet wheel 93 it moves the ratchet wheel 93 and the associated gears 95, 96, 98 and 99. Since the gear 99 is fixed to the conveyor drive shaft 75 by means of a pin 100 the conveyor drive shaft will be moved and the stack of deposited slices will be carried on the conveyor a predetermined distance leaving a space for a new stack of slices deposited during the repetition of the cycle.

If it is desired to shingle the slices as they are deposited, the shingling handle 35 is set on a predetermined setting to permit the pawl lever 69 to engage with the ratchet wheel 74 and thereby drive the conveyor drive shaft 75 with each forward movement of the pawl lever shaft 70. In this way each slice will be spaced from each succeeding slice, the distance of the spacing depending upon the setting of the handle 35. As will be apparent, the timing pawl 90 functions in the same manner as previously described regardless of the movement of the shingling pawl. Hence, the grouping mechanism will move the conveyor 4 after it has received a predetermined number of slices depending upon the setting of the grouping handle 36.

If it is desired to operate the device as a shingling device only the grouping handle 36 is moved to its farthest counterclockwise position which in turn causes the timing cam 50 to be moved so that the outer curved surface of the cam will continuously engage the cam roller 91 of the timing pawl 90 and prevent the latter from engaging the ratchet wheel 92.

If both handles 35 and 36 are moved to their extreme counterclockwise positions the conveyor belt 4 will remain stationary.

The invention provides a new and improved apparatus for operation with a slicer such as a meat slicer to group and/or shingle the slices onto a conveyor. The apparatus is characterized by simplicity and easy operation. It is also compact and requires very little modification of conventional meat slicers for attachment thereto.

The invention is hereby claimed as follows:

1. In a slicing machine having a conveyor, a drive shaft for the conveyor, and a fly mounted on a rotatable shaft for discharging slices onto the conveyor, a grouping and shingling device comprising a plurality of ratchet wheels mounted on said drive shaft including a driving ratchet wheel, a timing ratchet wheel and a shingling ratchet wheel, a driving pawl operatively associated with the driving ratchet wheel, a timing pawl operatively associated with the timing ratchet wheel, a shingling pawl operatively associated with the shingling ratchet wheel, a cam roller on the driving pawl, a cam roller on the timing pawl, a cam roller on the shingling pawl, a driving cam operatively associated with the driving pawl cam roller, a cam operatively associated with the timing pawl cam roller, a shingling cam operatively associated with the shingling pawl cam roller, means connecting the timing pawl ratchet wheel to the driving pawl cam, means operatively connecting the shingling ratchet wheel to said drive shaft, means operatively connecting the driving ratchet wheel to said drive shaft, means to cause said pawls to be reciprocated in the same direction simultaneously, manually operative adjusting means to change the position of the timing pawl cam with respect to its associated pawl, and manually operated adjusting means to change the position of the shingling pawl cam with respect to its associated pawl.

2. A grouping device for use in a slicing machine having a conveyor, a conveyor drive shaft, and a fly mounted on a fly shaft for delivering slices to the conveyor, comprising a driving ratchet wheel mounted on the drive shaft [and secured thereto], a timing ratchet wheel freely mounted on the drive shaft, a driving pawl operatively associated with said driving ratchet wheel, a timing pawl operatively associated with said timing ratchet wheel, a cam roller on the driving pawl, a cam roller on the timing pawl, a driving cam connected to said [driving] *timing* ratchet wheel and operatively associated with said cam roller on the driving pawl, a timing cam operatively associated with said cam roller on the timing pawl, common support means for said pawls, actuating means connected between the fly shaft and said support means for reciprocating said support means and the pawls thereon and operating the associated ratchet wheels, and manually operated adjusting means to change the position of the timing cam with respect to its associated pawl.

3. A grouping device for use in a slicing machine having a conveyor, a conveyor drive shaft, and a fly mounted on a fly shaft for delivering slices to the conveyor, comprising a driving ratchet wheel mounted on the drive shaft [and secured thereto], a timing ratchet wheel freely mounted on the drive shaft, a shingling ratchet wheel mounted on the drive shaft and secured thereto, a driving pawl operatively associated with said driving ratchet wheel, a timing pawl operatively associated with said timing ratchet wheel, a shingling pawl operatively associated with said shingling ratchet wheel, a cam roller on the driving pawl, a cam roller on the timing pawl, a [driving] *timing* cam connected to said driving ratchet wheel and operatively associated with the driving pawl cam roller, a timing cam operatively associated with the timing pawl cam roller, common support means for all of said pawls, actuating means connected between the fly shaft and said support means for reciprocating said support means and the pawls thereon and operating the associated ratchet wheels, manually operating adjusting means to change the position of the timing cam with respect to its associated pawl, and manually operated means to render said shingling pawl inoperative with respect to said shingling ratchet wheel.

4. A grouping device for use in a slicing machine having a conveyor, a conveyor drive shaft, and a fly mounted on a fly shaft for delivering slices to the conveyor, comprising a driving ratchet wheel mounted on the drive shaft [and secured thereto], a timing ratchet wheel freely mounted on the drive shaft, a driving pawl operatively associated with said driving ratchet wheel, a timing pawl operatively associated with said timing ratchet wheel, a cam roller on the driving pawl, a cam roller on the timing pawl, a driving cam connected to said [driving] *timing* ratchet wheel and operatively associated with said cam roller on the driving pawl, a timing cam operatively associated with said cam roller on the timing pawl, a shaft for supporting said pawls, an arm rigid with the fly shaft and reciprocable in a rotary movement therewith, a link connecting said arm with the shaft supporting said pawls, thereby to reciprocate said pawls simultaneously and operate the ratchet wheels associated therewith, and manually operated adjusting means to change the position of the timing cam with respect to its associated pawl.

*5. A grouping device for use in a slicing machine having a conveyor, a conveyor drive shaft, and a fly mounted on a fly shaft for delivering slices to the conveyor, comprising a driving ratchet wheel mounted on the drive shaft, a timing ratchet wheel freely mounted on the drive shaft, a driving pawl operatively associated with said driving ratchet wheel, a timing pawl operatively associated with said timing ratchet wheel, a cam roller on the driving pawl, a cam roller on the timing pawl, a driving cam connected to said timing ratchet wheel and operatively associated with said cam roller on the driving pawl, a timing cam operatively associated with said cam roller on the timing pawl, actuating means connected between the fly shaft and said pawls for reciprocating said pawls and operating the associated ratchet wheels, manually operated adjusting means to change the position of the timing cam with respect to its associated pawl, and means operatively associated with said timing pawl to readjust said timing pawl when it is out of proper timing.*

*6. A grouping device for use in a slicing machine having a conveyor, a conveyor drive shaft, and a fly mounted on a fly shaft for delivering slices to the conveyor, comprising a driving ratchet wheel mounted on the drive shaft, a timing ratchet wheel freely mounted on the drive shaft, a driving pawl operatively associated with said driving ratchet wheel, a timing pawl operatively associated with said timing ratchet wheel, a cam roller on the driving pawl, a cam roller on the timing pawl, a driving cam connected to said timing ratchet wheel and operatively associated with said cam roller on the driving pawl, a timing cam operatively associated with said cam roller on the timing pawl, actuating means connected between the fly shaft and said pawls for reciprocating said pawls and operating the associated ratchet wheels, manually operated adjusting means to change the position of the timing cam with respect to its associated pawl, and a timing pawl release cam operatively associated with said timing pawl to readjust said timing pawl when it is out of proper timing.*

*7. A grouping device for use in a slicing machine having a conveyor, a conveyor drive shaft, and a fly mounted on a fly shaft for delivering slices to the conveyor, comprising a driving ratchet wheel mounted on the drive shaft, a timing ratchet wheel freely mounted on the drive shaft, a driving pawl operatively associated with said driving ratchet wheel, a timing pawl operatively associated with said timing ratchet wheel, a cam roller on the driving pawl, a cam roller on the timing pawl, a driving cam connected to said timing ratchet wheel and opera-*

*tively associated with said cam roller on the driving pawl, a timing cam operatively associated with said cam roller on the timing pawl, actuating means connected between the fly shaft and said pawls for reciprocating said pawls and operating the associated ratchet wheels, manually operated adjusting means to change the position of the timing cam with respect to its associated pawl, a timing pawl release cam positioned adjacent said timing pawl, and means on said timing ratchet wheel adapted to operate said timing pawl release cam to readjust said timing pawl when it is out of proper timing.*

References Cited in the file of this patent or the original patent

UNITED STATES PATENTS

| | | |
|---|---|---|
| 1,231,959 | Stiles | July 3, 191 |
| 1,293,774 | Hieatzman | Feb. 11, 191 |
| 1,310,262 | Van Berkel | July 15, 191 |
| 1,519,354 | Brown | Dec. 16, 192 |
| 2,042,116 | Morris | May 26, 193 |